(12) United States Patent
Vichare et al.

(10) Patent No.: US 11,949,571 B2
(45) Date of Patent: Apr. 2, 2024

(54) UNIFIED TELEMETRY DATA

(71) Applicant: DELL PRODUCTS, LP, Round Rock, TX (US)

(72) Inventors: Nikhil M. Vichare, Austin, TX (US); Wen-hao Zeng, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 149 days.

(21) Appl. No.: 17/327,861

(22) Filed: May 24, 2021

(65) Prior Publication Data

US 2022/0377149 A1 Nov. 24, 2022

(51) Int. Cl.
*H04L 43/04* (2022.01)

(52) U.S. Cl.
CPC .................................. *H04L 43/04* (2013.01)

(58) Field of Classification Search
CPC ......... H04L 43/02; H04L 43/00; H04L 43/04; H04L 43/045; H04L 43/06; H04L 43/065; H04L 43/062; H04L 43/08; G06Q 10/10; G06F 11/30; G06F 11/3003; G06F 11/3006; G06F 11/301; G06F 11/302; G06F 11/3051; G06F 11/3055; G06F 11/34

See application file for complete search history.

(56) References Cited

U.S. PATENT DOCUMENTS

| | | | |
|---|---|---|---|
| 7,490,073 B1* | 2/2009 | Qureshi | G06N 5/048 706/56 |
| 10,073,753 B2 | 9/2018 | Boyapalle et al. | |
| 10,237,149 B1* | 3/2019 | Guo | H04L 43/04 |
| 2004/0103144 A1* | 5/2004 | Sallam | H04L 67/12 709/236 |
| 2017/0052821 A1* | 2/2017 | Wu | G06F 11/3433 |
| 2017/0149626 A1* | 5/2017 | Yoon | H04L 41/0631 |
| 2019/0236305 A1* | 8/2019 | Antonatos | H04L 63/10 |
| 2019/0342315 A1* | 11/2019 | Smelov | H04L 43/06 |
| 2020/0244704 A1 | 7/2020 | Andrews et al. | |
| 2020/0349920 A1* | 11/2020 | Al Bawab | G10L 15/063 |
| 2021/0373858 A1* | 12/2021 | Reynolds | G06F 16/906 |
| 2022/0012143 A1* | 1/2022 | Meeran | G06F 11/0751 |
| 2022/0100632 A1* | 3/2022 | Kulkarni | G06F 11/302 |
| 2022/0377149 A1* | 11/2022 | Vichare | H04L 43/06 |

* cited by examiner

*Primary Examiner* — David R Lazaro
(74) *Attorney, Agent, or Firm* — Larson Newman, LLP

(57) ABSTRACT

A memory stores telemetry data for an information handling system. A processor analyzes applications being executed within the information handling system, and determines one or more of the applications that collect and send the telemetry data. The processor also retrieves a first list of different sets of data to be tracked for each of the applications. Each of the sets of data to be tracked is associated with a different one of the applications. The processor creates a second list of data being logged in the information handling system. Based on the first and second lists, the processor creates a comprehensive list of data tracked by the applications.

20 Claims, 4 Drawing Sheets

300

| Use of Data 302 | Identifier 304 | Information 306 |
|---|---|---|
| Collection | Application | Optimizer |
| | Data Collected | Data transfer size |
| | Frequency | Five |
| Transmission | Platform | SDK |
| | Type | Log file |
| | Restrictions | Yes |
| ⋮ | ⋮ | ⋮ |

*FIG. 3*

UNIFIED TELEMETRY DATA

FIELD OF THE DISCLOSURE

The present disclosure generally relates to information handling systems, and more particularly relates to creating unified telemetry data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that may store telemetry data. A processor may analyze applications being executed within the information handling system, and determine one or more of the applications that collect and send the telemetry data. The processor also may retrieve a first list of different sets of data to be tracked for each of the one or more of the applications. Each of the sets of data to be tracked is associated with a different one of the one or more of the applications. The processor may create a second list of data being logged in the information handling system. Based on the first and second lists, the processor may create a comprehensive list of data tracked by the one or more of the applications, and display the comprehensive list to an individual associated with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a table for an application catalog according to at least one embodiment of the disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
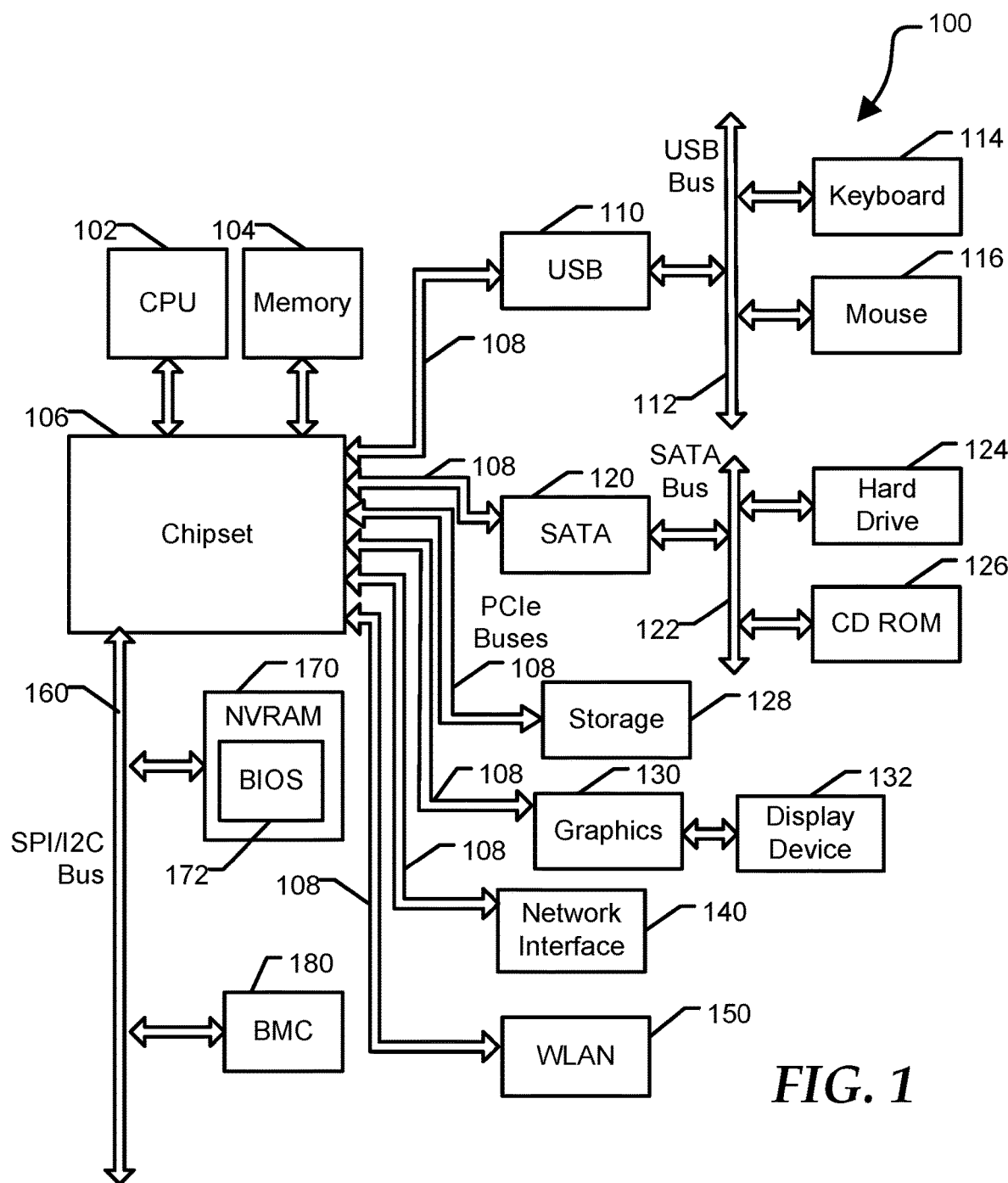
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
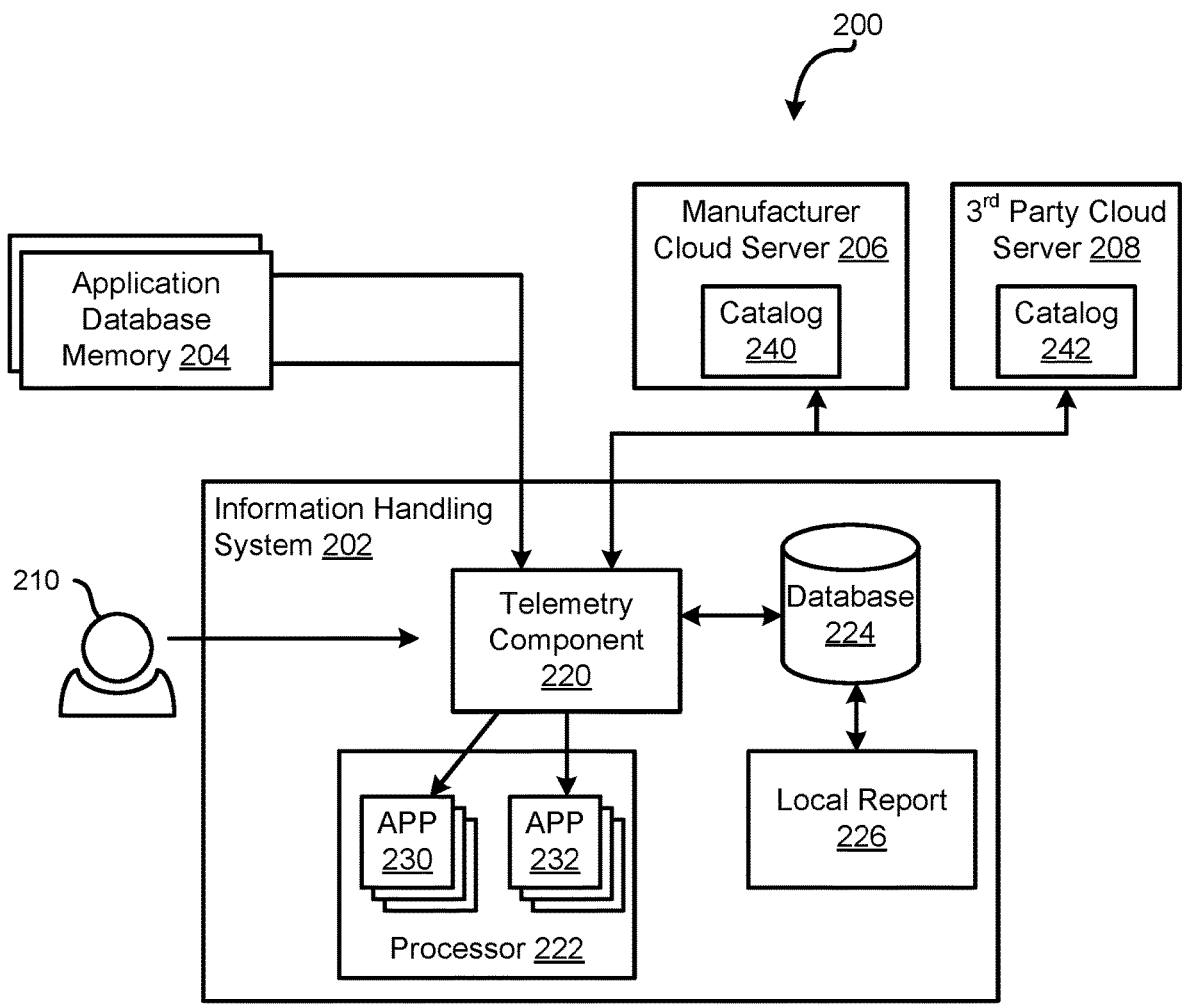
FIG. 2 is a block diagram of a portion of the system according to at least one embodiment of the disclosure.

In an example, information handling system 100 may be any suitable device including, but not limited to, information handling system 202 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates a system 200 including an information handling system 202, an application database memory 204, a manufacturer cloud server 206, and a third-party cloud server 208 according to at least one embodiment of the disclosure. In an example, an individual or user 210 may interface with information handling system 202 via any suitable manner, such as a keyboard, pointing device, display device, a graphical user interface, or the like. Information handling system 202 includes a telemetry component 220, a processor 222, and a memory or database 224 to store a local report 226. In an example, processor 222 may execute one or more applications including, but not limited to, manufacturer applications 230 and third-party applications 232. Information handling system 202 may communicate with application database memory 204, manufacturer cloud server 206, and third-party cloud server 208 via a network. In certain examples, system 200 may include any suitable number of third-party cloud servers 208. However, for clarity and brevity, only a single third-party cloud server 208 has been shown and described herein. Information handling system 202 may include any suitable number of components including, but not limited to, the components of information handling system 100 of FIG. 1. In an example, information handling system 202 may include additional components over those shown in FIG. 2 without varying from the scope of this disclosure. In certain examples, system 200 may include additional components over those shown in FIG. 2 without varying from the scope of this disclosure.

In an example, information handling system 202 may collect telemetry data for one or more applications executed in the information handling system. The telemetry data may be associated with any suitable operations of information handling system 202 including, but not limited to, the system level data, and application usage. In an example, the system level data may be any suitable data including, but not limited to, hardware data, power data, temperature data, and screen data. In certain examples, the ability of a particular information handling system to collect accurate and complete data may enable optimal experiences for individuals associated with the information handling system, such as individual 210 of information handling system 202. Accurate and complete telemetry data may also enhance diagnostics for information handling system 202, manageability of the information handling system, or the like. In an example, information handling system 202 may provide the telemetry data to any suitable server or component including, but not limited to, manufacturer cloud server 206 and third-party cloud server 208.

Previous information handling systems collect telemetry data associated with any suitable number of components or applications of the information handling system. However, individuals associated with the previous information handling systems may not be able to view or access all individual data elements tracked and sent from the information handling system. Telemetry data collected in an information handling system may vary based on one or more events within the information handling system. For example, the one or more events may include, but are not limited to, an individual installing/uninstalling applications within the information handling system, a usage persona changing in the information handling system, upgrading of applications, and adding/removing hardware in the information handling system. In certain examples, telemetry component 220 of information handling system 202 may improve the information handling system by enabling an individual, such as an information technology (IT) manager, to access and view all telemetry data collected within the information handling system. For example, telemetry component 220 may access and provide all telemetry data for manufacturer applications 230, third-party applications 232 or hardware components. Telemetry component 220 may improve information handling system 202 by determining all telemetry data that is tracked, even the data that is stored locally and not sent manufacturer cloud server 206 or third-party cloud server 208.

In an example, applications 230 and 232 may be installed in information handling system 202 in any suitable manner. For example, information handling system 202 may have one or more applications 230 pre-installed. In certain examples, individual 210 may utilize information handling system 202 may access one or more application database memories 204 to download one or more applications 230 and 232. In an example, application database memories 204 may be any suitable application data store including, but not limited to, a manufacturer application data store and a third-party application data store. Individual 210 may install applications 230 and 232 downloaded from application database memories 204. In certain examples, individual 210 may also uninstall one or more applications 230 and 232 from information handling system 202.

During operation, any suitable device within information handling system 202 may collect telemetry data for applications being executed or hardware within the information handling system. For example, each of applications 230 and 232 may include a separate telemetry platform to collect the telemetry data for the respective application. In an example, the telemetry platforms may collect telemetry data and provide the data to manufacturer cloud server 206 or third-party cloud server 208, or may store the data locally. In certain examples, the telemetry platform may be any suitable platform including, but not limited to, a software development kit (SDK) added to an application.

In an example, telemetry component 220 may perform one or more suitable operations to provide a unified set of telemetry data to individual 210. In an example, the unified telemetry data may be a combination of any suitable data including, but not limited to, data stored locally in database 224, data sent to manufacturer cloud server 206, and data sent to third-party cloud server 208. In certain examples, telemetry component 220 may be any suitable hardware circuitry to interface with one or more telemetry collection devices and to provide the collected telemetry data to individual 210. Telemetry component 220 may leverage a unified application programming interface (API) to provide all collected telemetry data to individual 210. In an example, telemetry component 220 may identify applications associated with manufacturer cloud server 206 and third-party cloud server 208, such as applications 230 and 232.

In an example, telemetry component 220 may perform one or more suitable operations to determine telemetry data collected within information handling system 202. For example, telemetry component 220 may scan all applications 230 and 232 and identify the applications that collect telemetry data. In an example, telemetry component 220 may also determine which applications 230 and 232 send telemetry data to manufacturer cloud server 206 or third-party cloud server 208. Telemetry component 220 may receive information associated data collection for different applications and versions from manufacturer cloud server 206 and third-party cloud server 208. In an example, the information may be located within catalogs 240 and 242. An exemplary catalog is illustrated in table 300 of FIG. 3.

FIG. 3 illustrates table 300 for an application catalog according to at least one embodiment of the disclosure. Table 300 includes a use of data column 302, an identifier column 304, and an information column 306. In an example, use of data 302 may indicate what particular telemetry data of an application is used for. For example, use of data column 302 may indicate data for collection and transmission, as indicated by 'collection' and 'transmission' in column 302. While only collection and transmission use of data 302 have been illustrated in table 300, one of ordinary skill in the art would recognize that the table or application catalog may include any suitable number of uses of data without varying from the scope of this disclosure.

In an example, any particular use of data 302, such as collection and transmission, may include any suitable number of identifiers 304 for the use of data. For example, collection data 302 may be associated with any suitable identifiers 304 including, but not limited to, an application name, data collected and frequency. Transmission data 302 may be associated with any suitable identifiers 304 including, but not limited to, a platform, type, and restrictions for the data.

In certain examples, identifiers 304 for a use of data 302 may include any suitable information 306 about the use. For example, application identifier 304 may be associated with information 306 for the application name, such as an optimizer application. Data collected identifier 304 of application may be associated with information 306 for a data transfer size for the application as the data collected. In an example, frequency identifier 304 may be associated with how often the data is collected by the application.

In an example, identifiers 304 for transmission may include any suitable information 306. For example, platform identifier 304 may be associated with an application to transmit the telemetry data, such as a SDK. The type identifier 304 may be associated with information 306 to indicate the type or data format that the telemetry data is stored, such as a log file. In an example, the restrictions identifier 304 may be associated with information 306 to indicate whether there are restrictions to how or if the data may be transmitted to manufacturer cloud server 206 or third-party cloud server 208. While only a single table 300 for an application catalog is shown, manufacturer cloud server 206 and third-party cloud server 208 of FIG. 2 may each include any suitable number of application catalogs. Each application catalog may be associated with a different application or version of an application. The different catalog for each application or version may enable dynamic privacy settings for telemetry data collected by application based on the information 306 for the restriction identifier 304.

Referring back to FIG. 2, telemetry component 220 may perform one or more suitable operations to determine what telemetry data is sent to manufacturer cloud server 206, what telemetry data is sent to third-party cloud server 208, and what telemetry data is stored locally without being sent to a cloud server. Based on the versions of the identified applications, telemetry component 220 may retrieve a list of data elements to be tracked from manufacturer cloud server 206 and/or third-party cloud server 208. In an example, the list of data elements to be tracked may be based on application catalog 240 and/or 242. In an example, telemetry component 220 may read an application log including a list of telemetry data being logged within the information handling system. Based on the application log, telemetry component may create a list of telemetry data being logged in information handling system 202.

In certain examples, the logged telemetry data may be based on usage of the information handling system and a persona. Based on the list of data elements to be tracked from the catalog information and the application log, telemetry component 220 may be able to distinguish data being sent to manufacturer cloud server 206 or third-party cloud server 208, and telemetry data may be kept and stored locally in information handling system 202, such as in database 224. Based on telemetry component 220 determining the telemetry data that is being collected for applications 230 and 232, an IT manager, such as individual 210, may receive statistics on the telemetry data collected and generate insights into the data collection.

In an example, telemetry platforms, such as Platinum SDK, of applications 230 and 232 may provide a signal to telemetry component 220 when a particular data collection is turned on or off. In this example, telemetry component 220 may enable dynamic data privacy reports based on a usage persona of applications 230 and 232 in information handling system 202. In certain examples, the dynamic privacy reports may include any suitable information to indicate whether the telemetry is sensitive. For example, the sensitivity information may include, but is not limited to, a sensitivity tag that when set may indicate whether the data is sensitive. In an example, applications 230 and 232 may not send sensitive telemetry data to manufacturer cloud server 206 or to third-party cloud server 208.

In certain examples, telemetry component 220 may utilize a combination of the list of data elements and the list of telemetry data being logged to create a comprehensive list of tracked telemetry data. In an example, telemetry component 220 may utilize the comprehensive list to create one or more reports of all tracked telemetry data within information handling system 202 including the data sent to manufacturer cloud server 206, data sent to third-party cloud server 208, and data stored locally on the information handling system. The report may be stored as local report 226 in any suitable memory, such as memory 224. In certain examples, telemetry component 220 may store unique reports for each of applications 230 and 232, and the reports may be stored in an application identifier by application identifier manner within memory 224.

In an example, telemetry component 220 may provide individual 210 with a single report of all data tracked in information handling system 202. For example, the single report indicating what data is sent to manufacturer cloud server 206, what data is sent to third-party cloud server 208, and data stored locally on the information handling system 202. The report may be provided to individual 210 in any suitable manner including, but not limited to, via a GUI of a display device and an electronic mail message. In certain examples, this single report may vary based on a configuration of information handling system 202, on a current usage persona, on versions of applications 230 and 232, or the like. The report may be organized in any suitable manner including, but not limited to, a classification of telemetry data, a purpose of the data, the value of the data, and whether the data is utilized. In an example, the data may be utilized by information handling system 202, manufacturer cloud server 206, or third-party cloud server 208. As described above, telemetry component 220 may enable a unified data privacy report across all applications 230 and 232 even when the applications are using different telemetry frameworks and being managed by different entities.

Figure 4:
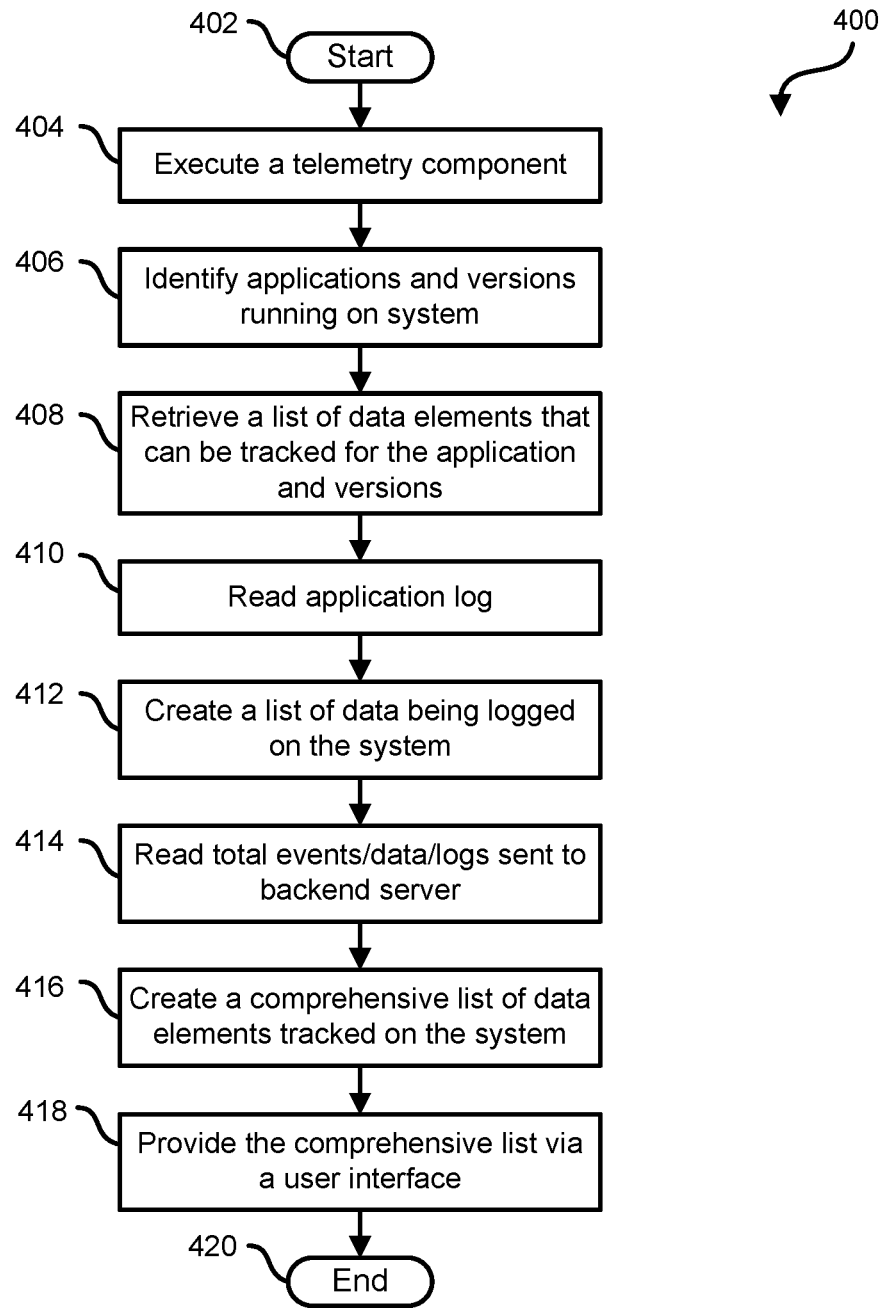
FIG. 4 is a flow diagram of a method for providing unified telemetry data collection within an information handling system according to at least one embodiment of the current disclosure.

FIG. 4 illustrates a method 400 for providing unified telemetry data collection within an information handling system according to at least one embodiment of the current disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 202 depicted in FIG. 2, or any other type of system, controller, device, module, processor, or any combination thereof, operable to employ all, or portions of, the method of FIG. 1.

At block 404, a telemetry component is executed. In an example, the execution of the telemetry component may be performed in any suitable manner including, but not limited to, a processor executing an application and a hardware circuit telemetry component being enabled. In certain examples, the telemetry component may be factory installed within the information handling system or may be installed post factory by an individual associated with the information handling system. If the telemetry component is an application executed by a processor, the individual may download the telemetry component from a manufacturer database or from a third-party application data store and may install the downloaded telemetry component.

At block 406, different applications and the versions of those applications are identified. In an example, the identified applications may be those applications executed by a processor of the information handling system. The applications may be any suitable applications, such as manufacturer applications and third-party applications. In an example, the applications may be determined in any suitable manner including, but not limited to, application catalogs and application whitelists.

At block 408, one or more lists of data elements that may be tracked are retrieved. In an example, the list of data elements may be retrieved in any suitable manner including, but not limited to, accessing a data catalog in a manufacturer cloud server, and accessing a data catalog in a third-party cloud server. Based on the versions of the identified applications, a particular list of data elements to be tracked may be retrieved.

At block 410, an application log is read. In an example, the application log may include a list of telemetry data being logged within the information handling system. At block 412, a list of telemetry data being logged in the information handling system is created. In certain examples, the logged telemetry data may be based on usage of the information handling system and a persona. The persona for the information handling system may be determined in any suitable manner including, but not limited to, a machine learning system receiving metrics or usage profiles, performing one or more operations, and outputting a classification of the personas.

At block 414, a total amount of events, telemetry data, and logs sent to one or more backend servers is read. In an example, the backend servers may be any suitable servers including the manufacturer cloud server and the third-party cloud server. In certain examples, the events, telemetry data, and logs are read in any suitable manner, such as SDKs of the applications.

At block 416, a comprehensive list of data elements tracked on the information handling system is created. In an example, the comprehensive list may be created in any suitable manner. For example, a telemetry component of the information handling system may utilize a combination of the list of data elements that may be tracked, and the list of telemetry data being logged to create the comprehensive list. At block 418, the comprehensive list is provided via a user interface, and the flow ends at block 420. In an example, the comprehensive list may be provided in response to an individual requesting access to the telemetry data.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a memory to store telemetry data for the information handling system; and
a processor to communicate with the memory, the processor to:
analyze a plurality of applications being executed within the information handling system;
determine one or more of the applications that collect and send the telemetry data;
execute a machine learning system to determine a usage persona;
retrieve a first list of different sets of data to be tracked for each of the one or more applications, wherein each of the sets of data to be tracked is associated with a different one of the one or more applications, wherein a first set of data tracked for a first application is based on a version of the first application and the determined usage persona, wherein different catalogs for the first application dynamically set corresponding different privacy settings for telemetry data collected by the first application based on different restriction identifiers for the first application;

create a second list of data being logged in the information handling system;

based on the first and second lists, create a comprehensive list of data tracked by the one or more applications; and display the comprehensive list on a graphical user interface for viewing by an individual associated with the information handling system.

2. The information handling system of claim 1, wherein the first list of different sets of data to be tracked is generated based on a first application catalog in a first cloud server and a second application catalog in a second cloud server.

3. The information handling system of claim 2, wherein based on the first list of different sets of data to be tracked, the processor to determine first telemetry data to be sent to the first cloud server and second telemetry data to be sent to the second cloud server.

4. The information handling system of claim 3, wherein based on the first list of different sets of data to be tracked and the second list of data being logged, the processor further to determine third telemetry data to be stored locally on the information handling system.

5. The information handling system of claim 4, wherein the comprehensive list includes the first, second, and third telemetry data collected in the information handling system.

6. The information handling system of claim 1, wherein the comprehensive list includes sensitive tags associated with collected telemetry data.

7. The information handling system of claim 6, wherein the telemetry data with a sensitive tag indicating that sensitive telemetry data, the processor does not transmit the telemetry data.

8. The information handling system of claim 1, wherein the first set of data tracked for the first application is further based on a hardware configuration for the first application.

9. The information handling system of claim 1, wherein the first list of different sets of data to be tracked is generated based on a first application catalog in the first cloud server and a second application catalog in the second cloud server.

10. The information handling system of claim 9, wherein based on the first list of different sets of data to be tracked, the processor to determine the first telemetry data to be sent to the first cloud server and the second telemetry data to be sent to the second cloud server.

11. The information handling system of claim 1, wherein the first set of data tracked for the first application is further based on a hardware configuration for the first application.

12. A method comprising:
analyzing, by a processor of an information handling system, a plurality of applications being executed within the information handling system;
determining one or more of the applications that collect and send the telemetry data;
executing a machine learning system to determine a usage persona;
retrieving a first list of different sets of data to be tracked for each of the applications, wherein each of the sets of data to be tracked is associated with a different one of the applications, wherein a first set of data tracked for a first application is based on a version of the first application and the determined usage persona, wherein different catalogs for the first application dynamically set corresponding different privacy settings for telemetry data collected by the first application based on different restriction identifiers for the first application;
creating a second list of data being logged in the information handling system;
based on the first and second lists, creating a comprehensive list of data tracked by the applications; and
displaying the comprehensive list on a graphical user interface for viewing by an individual associated with the information handling system.

13. The method of claim 12, further comprising:
based on a first application catalog in a first cloud server and a second application catalog in a second cloud server, generating the first list of different sets of data to be tracked.

14. The method of claim 13, further comprising:
based on the first list of different sets of data to be tracked, determining first telemetry data to be sent to the first cloud server and second telemetry data to be sent to the second cloud server.

15. The method of claim 14, further comprising:
based on the first list of different sets of data to be tracked and the second list of data being logged, determining third telemetry data to be stored locally on the information handling system.

16. The method of claim 15, wherein the comprehensive list includes the first, second, and third telemetry data collected in the information handling system.

17. The method of claim 12, wherein the comprehensive list includes sensitive tags associated with collected telemetry data.

18. The method of claim 17, wherein the telemetry data with a sensitive tag indicating that sensitive telemetry data, the processor does not transmit the telemetry data.

19. The method of claim 18, wherein the first set of data tracked for the first application is further based on a hardware configuration for the first application.

20. An information handling system comprising:
a memory to store telemetry data for the information handling system; and
a processor to communicate with the memory, the processor to:
analyze a plurality of applications being executed within the information handling system;
determine one or more of the applications that collect and send the telemetry data;
execute a machine learning system to determine a usage persona;
retrieve a first list of different sets of data to be tracked for each of the one or more applications, wherein each of the sets of data to be tracked is associated with a different one of the one or more applications, wherein a first set of data tracked for a first application is based on a version of the first application and the determined usage persona, wherein different catalogs for the first application dynamically set corresponding different privacy settings for telemetry data collected by the first application based on different restriction identifiers for the first application;
create a second list of data being logged in the information handling system;
based on the first and second lists, create a comprehensive list of data tracked by the one or more applications; and
display the comprehensive list on a graphical user interface for viewing by an individual associated with the information handling system, wherein the comprehensive list includes first telemetry data sent to a first cloud server, second telemetry data send to a second cloud server, and third telemetry data stored locally in the information handling system.

* * * * *